United States Patent
Hambitzer et al.

(10) Patent No.: US 7,488,421 B2
(45) Date of Patent: Feb. 10, 2009

(54) METHOD AND DEVICE FOR THE PURIFICATION, ESPECIALLY DESALINATION, OF WATER

(75) Inventors: Guenther Hambitzer, Pfinztal (DE); Heide Biollaz, Waldshut (DE); Markus Borck, Stuttgart (DE); Christiane Ripp, Pfinztal (DE)

(73) Assignee: Clean Water Gesellschaft Fuer Wasseraufbereitungstechnik mbH, Pfinztal (DE)

( * ) Notice: Subject to any disclaimer, the term of this patent is extended or adjusted under 35 U.S.C. 154(b) by 441 days.

(21) Appl. No.: 10/556,363

(22) PCT Filed: Apr. 24, 2004

(86) PCT No.: PCT/DE2004/000855

§ 371 (c)(1),
(2), (4) Date: Nov. 10, 2005

(87) PCT Pub. No.: WO2004/101444

PCT Pub. Date: Nov. 25, 2004

(65) Prior Publication Data

US 2006/0108286 A1    May 25, 2006

(30) Foreign Application Priority Data

Mar. 12, 2003  (DE) ................ 103 21 146

(51) Int. Cl.
| | |
|---|---|
| B01D 15/00 | (2006.01) |
| B01D 1/28 | (2006.01) |
| B01D 3/00 | (2006.01) |
| C02F 17/09 | (2006.01) |
| C02F 1/02 | (2006.01) |
| B01J 35/00 | (2006.01) |

(52) U.S. Cl. ............ 210/640; 210/175; 210/181; 204/158.2; 204/450; 204/554; 204/403.06; 202/82; 202/266; 202/181; 203/10; 203/12

(58) Field of Classification Search .......... 210/640, 210/175, 181; 204/158.2, 450, 554, 403.06, 204/415, 418; 202/82, 266, 181; 203/10, 203/12, DIG. 1, DIG. 17
See application file for complete search history.

(56) References Cited

U.S. PATENT DOCUMENTS 3,340,186 A    9/1967   Weyl
(Continued)

FOREIGN PATENT DOCUMENTS

| JP | 61259710 | 11/1986 |
| WO | WO 03/028862 A | 4/2003 |

OTHER PUBLICATIONS

Ying Kong et al., "Plasma Polymerization of Octafluorocyclobutane and Hydrophobic Microporous Composite Membranes for Membrane Distillation", Journal Of Applied Polymer Science, vol. 46, No. 2, Sep. 15, 1992, pp. 191-199.

(Continued)

Primary Examiner—Ana M Fortuna
(74) Attorney, Agent, or Firm—Rothwell, Figg, Ernst & Manbeck, PC (57) ABSTRACT

Water processing method, in particular for producing fresh water from salt water by membrane distillation. In comparison with previously known methods, a significant reduction in investment cost and operating cost can be achieved by the combination of the following measures:

The water to be processed is kept in a supply chamber the wall of which is formed at least in part by a hydrophobic membrane being permeable for water vapor.

A hydrophilic membrane having a greater thickness in comparison with the hydrophobic membrane and a lower thermal conductivity per unit area runs in parallel with the hydrophobic membrane.

By the pumping action a vapor pressure difference is produced between the water to be processed and the fresh water so that the membrane distillation is driven by the vapor pressure difference resulting from the pumping action, the water condensing in the pores of the hydrophilic membrane.

30 Claims, 1 Drawing Sheet

U.S. PATENT DOCUMENTS

| | | | |
|---|---|---|---|
| 3,923,426 | A | 12/1975 | Theeuwes |
| 4,265,713 | A | 5/1981 | Cheng |
| 4,419,187 | A | 12/1983 | Cheng et al. |
| 4,419,242 | A | 12/1983 | Cheng et al. |
| 4,473,473 | A | 9/1984 | Cheng |
| 4,476,024 | A | 10/1984 | Cheng |
| 4,545,862 | A | 10/1985 | Gore |
| 5,102,550 | A * | 4/1992 | Pizzino et al. .............. 210/640 |
| 6,083,670 | A * | 7/2000 | Sugawara et al. ........... 430/399 |
| 7,166,244 | B2 * | 1/2007 | Cella et al. .................. 252/582 |
| 7,217,343 | B2 * | 5/2007 | Land ............................. 203/1 |
| 2002/0166592 | A1 | 11/2002 | Juan et al. |

OTHER PUBLICATIONS

Korngold et al, "Water desalination by pervaporation with hollow fiber membranes", Desalination, vol. 107, No. 2, Oct. 1, 1996, pp. 121-129.

Bouchekima et al. "The performance of the capillary film solar still installed in South Algeria" Desalination, vol. 137, (2001), pp. 31-38.

C. L. Rice et al., "Electrokinetic Flow in a Narrow Cylindrical Capillary", J. Phys. Chem., vol. 69, (1965). pp. 4017-4024.

S. Zeng et al., "Fabrication and characterization of electro-osmotic micro-pumps", Sensors and Actuators B, vol. 79 (2001), pp. 107-114.

* cited by examiner

METHOD AND DEVICE FOR THE PURIFICATION, ESPECIALLY DESALINATION, OF WATER

CROSS REFERENCE TO RELATED APPLICATION

This application is a 35 USC § 371 National Phase Entry Application from PCT/DE2004/000855, filed Apr. 24, 2004.

The present invention relates to a water processing method and a corresponding apparatus. The most important application is for producing fresh water (clear water) from salt water (especially seawater or brackish water). Hereafter reference is made to this field of application as an example. However, the invention is also suitable for other applications in which the object is to obtain purified water by distillation from contaminated water. This includes in particular purification of water contaminated with bacteria or viruses (e.g., wastewater or river water).

Desalination of seawater and other water processing methods are of great importance in supplying drinking water to the world's population. Of all the surface water on the planet, only approximately 2.5% is fresh water. Of this, approximately 80% is bound as moisture in soil or frozen in the polar icecaps, so only approximately 0.5% of the total surface water is available as drinking water. Furthermore, drinking water supplies are very unevenly distributed. Therefore, a large portion of the planet's population suffers from water shortage.

To overcome this problem, numerous methods have been proposed for desalination of seawater. Some of the requirements to be met are difficult, because seawater has a salt content of approximately 30 g/L, whereas according to the World Health Organization (WHO), the salt content of drinking water must not exceed 0.5 g/L. In conventional distillation methods, salt water is evaporated by applying heat and then condensed again on a cooling surface. To reduce the cost of the high energy consumption, there have been many attempts to use solar energy as the energy source. A special type of such a system ("solar still") is described in the publication Bouchekima et al.: "The performance of the capillary film solar still installed in South Algeria" from *Desalination* 137 (2001) 31-38.

Improved condensation of the evaporated water is achieved with this solar still by using a capillary structure on the top side of the condensation surface.

In addition, various membrane methods have been under discussion for a long time. These include reverse osmosis in which salt water is forced under pressure through a membrane whose pores are of a size such that the salt is retained. Another method is electrodialysis in which two electrodes are immersed in an electrolyte solution. In the electric field of a DC-voltage, ion migration occurs in the salt water. By connecting cation and anion exchange membranes in an alternating series between the electrodes of an electrolysis cell, it is possible to direct the ion flow so that there is an increase in the concentration of electrolyte in the outer chambers while there is a decrease in concentration in the central chamber, i.e., a desalination effect occurs.

The membrane methods also include membrane distillation in which the water to be processed, which hereafter for the sake of simplicity is referred to as salt water, is held in a supply chamber whose wall is formed at least in part by a hydrophobic porous membrane. The pore size of the membrane, taking into account its hydrophobic properties (i.e., its surface tension with respect to water) must be such that the salt water does not fill the pores of the membrane, so the pores of the hydrophobic membrane contain air. In other words, the maximum hydrostatic pressure, at which water will no longer pass through the hydrophobic membrane, also known as the bubble pressure, is lower than the pressure occurring in the supply chamber during operation of the method.

In membrane distillation, the salt water is evaporated through the hydrophobic membrane. The gaseous water condenses on the distillate side (fresh water side). The distillation process (like conventional distillation processes) is based on the temperature difference between seawater which is heated and condensing fresh water which is cooled. Various membrane distillation methods are described, for example, in:

U.S. Pat. No. 3,340,186 (P. K. Weyl)
U.S. Pat. No. 4,545,862 (Gore et al.)
U.S. Pat. Nos. 4,265,713, 4,476,024, 4,419,187 and 4,473,473 (all by Cheng et al.).

With this as a background, the present invention is based on the technical problem of providing a method for water processing, in particular for desalination of water, and a corresponding device which are characterized by reduced operating and investment cost.

This technical problem is solved by a water processing method in which the salt water is held in a supply chamber, the wall of which is formed at least in part by a hydrophobic water vapor-permeable membrane, which has a pore size such that the salt water does not fill up the pores and in which a hydrophilic membrane is arranged parallel to the hydrophobic membrane, the hydrophilic membrane having a greater thickness in comparison with the hydrophobic membrane and having a lower thermal conduction per unit area and in which through a pumping effect a difference in vapor pressure is created between the salt water and the fresh water so that membrane distillation is driven by the vapor pressure difference resulting from pumping action, the water condensing in the pores of the hydrophilic membrane.

The invention also is directed to an apparatus for processing water, in particular for extracting fresh water from salt water by membrane distillation, the apparatus comprising a supply chamber, the wall of which is formed at least in part by a hydrophobic water vapor-permeable membrane whose pore size is such that the salt water does not fill up the pores, a hydrophilic membrane running parallel to the hydrophobic membrane, the hydrophilic membrane having a greater thickness in comparison with the hydrophobic membrane and having a lower thermal conduction per unit area so that the water condenses in the pores of the hydrophilic membrane near the interface with the hydrophobic membrane and also comprising a pump mechanism by means of which a difference in vapor pressure between the salt water and the fresh water is created, so that the membrane distillation is driven by the vapor pressure difference resulting from the pumping action, the water condensing in the pores of the hydrophilic membrane.

The terms "hydrophilic" and "hydrophobic" are to be understood in the conventional sense: A surface is "hydrophilic" when the relative attraction between the water molecules is less than the attraction between the water molecules and the solid surface. In the case of a "hydrophobic" surface, the opposite statement is applicable. The angle of contact between the liquid and a hydrophilic (wettable) surface is less than 90° (in the absence of other forces) but it is greater than 90° in the case of a hydrophobic surface.

The hydrophobic membrane should be as thin as possible. Its thickness is preferably less than 100 µm, but values of at most 10 µm or even at most 1 µm are especially preferred. The water vapor permeability usually results from the fact that the hydrophobic membrane is porous with a pore size of at least a few nanometers. In the case of an extremely thin hydrophobic membrane, however, the water vapor permeability may also be based on a permeability of the membrane which cannot be regarded as porosity in this sense. The upper limit of pore size results from the above mentioned condition regarding the bubble pressure. Taking this limitation into account, the pore size should be as large as possible. The following synthetic (polymeric) materials are especially suitable for the hydrophobic membrane: polytetrafluoroethylene, polyvinyl chloride.

The hydrophilic membrane need not be homogeneous. In particular, it may comprise a plurality of layers. Different porous, in particular synthetic, layer materials are suitable. If the untreated layer material is hydrophobic, the required hydrophilicity can be achieved by a suitable treatment of the internal surface (i.e., the surface bordering the pores in the interior of the material). Such methods are known; for example, hydrophobic polycarbonate is hydrophilized by a thin surface coating of polyvinylpyrrolidone.

Especially suitable plastic materials for the hydrophilic membrane include the following: cellulose, cellulose acetate, cellulose nitrate, polysulfone and polyether sulfone.

Due to the fact that the hydrophilic membrane is thicker than the hydrophobic membrane (thickness ratio preferably at least 10, especially preferably at least 100) and its thermal conduction per unit area is much lower than that of the hydrophobic membrane, the temperatures established on both sides of the hydrophobic membrane during operation will differ only slightly, the temperature on the fresh water side being a little higher than the temperature on the salt water side. Accordingly, the temperature-related surplus of the vapor pressure on the fresh water side is only small. Due to a pumping action on either the salt water side or the fresh water side, this surplus of the vapor pressure is overcompensated, resulting in a mass transport through the hydrophobic membrane in the direction of the hydrophilic membrane, whereupon the water condenses in the pores of the hydrophilic membrane. In contrast with the known membrane distillation methods in which a mass transport is achieved by the fact that the fresh water has a lower temperature than the salt water due to cooling and therefore also has a lower vapor pressure, the pressure difference in the inventive method results from the pumping action.

Due to the structural measures and process conditions explained here, the pores of the hydrophilic membrane are being filled with fresh water at the start of distillation and then further condensation takes place in the direct vicinity of the limiting external surface of the hydrophilic membrane facing the hydrophobic membrane. In view of the thermal conditions explained here, the distillation takes place preferably almost isothermally, the difference between the temperature of the condensing fresh water and the temperature of the evaporating salt water being less than 30° C., preferably less than 10° C., especially preferably less than 1° C. ("quasi-isothermal membrane distillation").

Another result of the thermal conditions explained here is that the heat of condensation, which is generated by the condensation on the fresh water side, flows almost completely (with a minimum fraction of 60%) directly through the hydrophobic membrane to the seawater being evaporated, because the thermal resistance encountered by this heat flow is much lower than the thermal resistance formed by the hydrophilic membrane which provides thermal insulation. Consequently, a large portion of the heat of evaporation required for evaporating the seawater results from direct recycling of the heat of condensation through the hydrophobic membrane. This greatly reduces the energy consumption of the process.

With regard to these factors, the present invention differs fundamentally from some of the United States patents by Cheng cited above, e.g., U.S. Pat. No. 4,419,242, where the use of a thin hydrophilic layer, which may run on the seawater side and/or on the fresh water side of the hydrophobic membrane and may be either porous or nonporous, is recommended in a different context. Cheng describes how the salt concentration increases over time in a traditional membrane distillation through a hydrophobic membrane and therefore the wetting properties of the membrane change. Due to this effect salt water fills the pores of the hydrophobic membrane and thereby destroys the required vapor barrier (water-logging). This is said to be prevented by the use of the hydrophilic membrane mentioned above. Generally Cheng describes a conventional membrane distillation driven by a sufficiently great temperature difference between the evaporating salt water and the condensing fresh water.

In the context of the present invention, the required vapor pressure difference can be achieved by different pumping methods. In principle it is possible to put the salt water under a sufficiently high pressure by using a conventional pump. However, this requires that the supply chamber and the membrane have an adequate pressure resistance.

Instead of or in addition to this, a micropump method is preferably used within the scope of the present invention. In this case the pumping action is based on forces acting on the water molecules inside the pores of the hydrophilic membrane ("intraporous pump mechanism"). An electro-osmotic pump method which is explained in greater detail below is especially suitable for this purpose.

The present invention is explained in greater detail below on the basis of exemplary embodiments which are depicted in the figures. The particulars shown there may be used individually or in different combinations to create preferred embodiments of the present invention.

Figure 1:
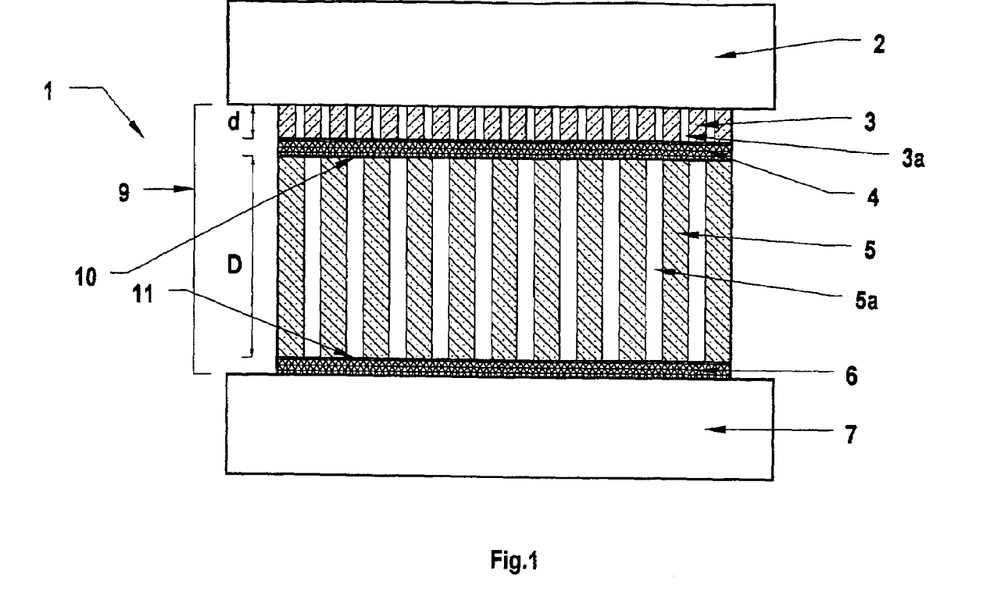
FIG. 1 shows a schematic sectional view of the essential parts of a first embodiment of a device suitable for implementation of the present invention.

The water desalination device 1 shown in FIG. 1 consists of a supply chamber 2, a hydrophobic membrane 3, a first electrode 4, a hydrophilic membrane 5, a second electrode 6 and a fresh water chamber 7. This diagram is highly schematized. In particular, the thickness of the membranes 3, 5 and the electrodes 4, 6 is shown as greatly exaggerated. In reality, these components form a sequence of layers that run parallel and are relatively thin in relation to their (equal) outside dimensions. These layers are attached in such a way that they are in direct contact with one another.

For securing these layers within the stack of layers labeled as 9 on the whole, various methods may be used which ensure the required contact and do not interfere with the passage of vapor and/or liquid which is also required. In particular the entire layer stack 9 may be held together by suitable mechanical means. As an alternative, sufficiently open-pored layer-connecting techniques may be used. In particular, the electrodes 4 and 6 and the hydrophobic membrane may be applied to the hydrophilic membrane, which is relatively thick and acts as a carrier, by lamination or some other coating method (e.g., vapor-phase deposition).

The stack of layers 9 is connected to the supply chamber 2 in such a way that it completely closes an opening of this chamber (not shown in the figure). It thus forms a part of the walls bordering the supply chamber. Different shapes known in the state of the art would of course be possible, e.g., prismatic, coiled, tubular forms, etc.

As explained above (and as is customary in membrane distillation methods), the hydrophobic membrane 3 is made of a material that is not wetted by water so that water vapor can penetrate through its pores 3a (depicted symbolically in the figure) but liquid water cannot. Water vapor passes through the first electrode 4, which is also porous, whereby it enters the pores 5a (again depicted symbolically) in the hydrophilic membrane 5. According to the invention, condensation to liquid water takes place in the pores 5a of the hydrophilic membrane 5. This includes cases in which the first electrode 4 is part of the hydrophilic membrane and is designed so that condensation takes place in the pores of the electrode 4 at the phase boundary with the hydrophobic membrane. Driven by a pumping action water then passes from the hydrophilic membrane through the second electrode 6 (also porous) and then enters the fresh water chamber 7 from which it is flows, preferably continuously, into a collecting tank (not shown). This may be supported by a lower pressure generated by pumping.

A first important prerequisite of the inventive function is that the thermal conduction per unit area of the hydrophilic membrane 5 is lower (preferably very much lower) than the thermal conduction per unit area of the hydrophobic membrane 3. The thermal conduction of a flat structure such as the membranes used here is proportional to the thermal conductivity of the material used and is inversely proportional to its thickness. To implement the condition mentioned here, the thermal conductivity of the hydrophobic membrane 3 should be as high as possible and the thermal conductivity of the hydrophilic membrane 5 should be as low as possible. However, the choice of these materials is subject to many other restrictions, e.g., with regard to wetting properties, pore size, porosity and mechanical strength. It is therefore possible that in a concrete case the thermal conductivity of the hydrophobic membrane 3 is only insignificantly higher or even lower than the corresponding value of the hydrophilic membrane 5.

In the practical implementation of the present invention, the thickness of the materials used is of great influence. Preferably the layer thickness d of the hydrophobic membrane 3 should be very small. Numerical values were mentioned above. The thickness of the hydrophilic membrane 5 is preferably at least ten times, especially preferably at least one hundred times the thickness of the hydrophobic membrane 3. The absolute value of the thickness of the hydrophilic membrane 5 is preferably at least 0.1 mm, especially preferably at least 1 mm. On the whole, the thermal conduction per unit area through the hydrophobic membrane 3 should be at least three times the thermal conduction per unit area through the hydrophilic membrane 5.

For the practical success of the present invention, it is also important that the hydrophobic membrane 3 has sufficiently high vapor permeability. It should preferably be at least 100 L/(h·m$^2$) with a pressure difference of 60 bar. The pore size of the hydrophobic membrane 3 should preferably be at most 100 μm, especially preferably at most 5 μm.

Figure 2:
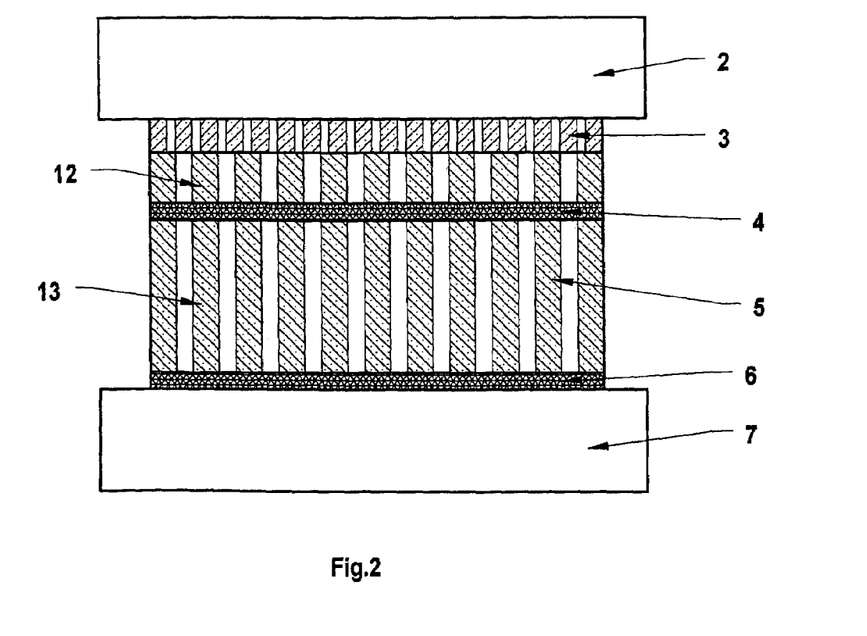
FIG. 2 shows a schematic sectional view of the essential parts of a second embodiment of a device suitable for implementation of the present invention.

As explained previously, another important feature for the function of the present invention is that the vapor pressure difference between the salt water and the fresh water required for membrane distillation is maintained by pumping action. In the embodiment depicted in the figures, this is accomplished by means of a micropump method which is implemented as an electro-osmotic pump. To this end, a hydrophilic membrane is used, which has a positive or negative surface charge on its internal surface. This condition can be met by a suitable choice of materials. In particular, a membrane whose internal surface is coated with an electron exchange material may be considered for use. An electric field is generated within the membrane 5 by the two electrodes 4, 6 running parallel to the limiting external surfaces 10, 11 of the hydrophilic membrane 5, a suitable voltage being applied to these electrodes during operation. In general, a DC-voltage is suitable. However, there are also methods in which a pulsating voltage or a modified alternating voltage is used. The electro-osmotic pump action is based on the fact that, due to the electric charge carriers present on the walls of the pores, a diffuse double layer is formed inside the pores and the ions in the liquid are accelerated in the electric field according to its polarization and their charge polarity. More information regarding electro-osmotic pump methods can be obtained from the publications cited below in the description of an example. Within the scope of the present invention, the first electrode 4 may have either a positive or negative charge (and the second electrode 6 may then be negative or positive accordingly). Which of these polarities is selected in the individual case will depend on the polarity of the charge on the inside surface of the hydrophilic membrane. The electrode polarity must at any rate be selected so that ions are accelerated in the direction away from the hydrophobic membrane, so that water is pumped out of the pores 5a of the hydrophilic membrane towards the fresh water chamber 7.

During operation, the pores 5a of the hydrophilic membrane 5 are almost completely filled so that condensation inside the pores 5a takes place in immediate proximity to the interface 10 of the hydrophilic membrane 5 facing the hydrophobic membrane 3. This is caused by a self-regulating effect which can be explained on the basis of the capillary condensation effect as follows. At the beginning of the distillation process, the water vapor passing through the hydrophobic membrane 3 condenses in the pores 5a due to their hydrophilic capillary properties. Thereby the pores 5a gradually fill up until the meniscus of the condensing fresh water is close to the interface 10. In this state, the efficacy of distillation depends on the degree of concave curvature of the condensation surface (i.e., the meniscus of water in the pores 5a) which in turn depends on the reduced pressure created by the pumping action. Consequently, the concave curvature increases with an increase in reduced pressure due to pumping action so that the efficacy of capillary condensation is increased. This causes more water vapor to be resupplied and the curvature of the meniscus tends to become smaller.

This self-regulating behavior is important for the function of the present invention because then the location of condensation (the aforementioned meniscus) is very close to the hydrophobic membrane 3 (due to its small thickness) and very close to the site of evaporation. Therefore, the quasi-isothermal process mentioned above is achieved, which in turn results in a very low energy consumption.

FIG. 2 shows an embodiment in which the first electrode 4 runs within the hydrophilic membrane 5 which consists of two layers 12 and 13. In principle the electrodes 4 and 6 may be localized differently within the device, provided the condition is met that the electric field between them acts on the liquid in the pores 5a of the hydrophilic membrane (when a voltage is applied). For example, the second electrode 6 may also be positioned on the side of the fresh water chamber 7 facing away from the hydrophilic membrane 5. The position of the electrodes 4, 6 has an influence on the self-regulating behavior mentioned above with regard to the meniscus of the fresh water condensing in the pores 5a. The arrangement depicted in FIG. 2 may be advantageous in this regard.

As a rule, at least one of the electrodes 4, 6 is fixedly connected to the hydrophilic membrane 5 and/or integrated therein. Such electrodes can be regarded as components of the hydrophilic membrane 5. In particular this means that in the case of an electrode integrated into the hydrophilic membrane 5 at the interface 10, condensation may take place in the part of the membrane 5 formed by the electrode 4.

As mentioned above, the hydrophilic membrane may be made of different materials which usually have approximately spherical pores. However, membrane materials having pores which run essentially in a straight line between the interfaces 10 and 11, as depicted in FIGS. 1 and 2, are also available. Such materials may be used to advantage for the hydrophilic membrane according to the present invention.

In the embodiment with an electro-osmotic pumping method, as depicted in the figures, electrochemical effects are to be taken into account. In particular, hydrogen may be generated at the cathode if the voltage is higher than approximately 1.8 V. This can be utilized to produce hydrogen in addition to purified water. In this case the electrode facing the hydrophobic membrane is preferably the anode. It is, however, also possible to reduce or eliminate unwanted electrochemical effects by using suitable ion exchange membranes which hinder the passage of ions or gases (e.g., oxygen) that would cause unwanted electrochemical reactions.

The following example is presented to further illustrate the present invention:

To describe the method, various process steps must be taken into account. The sample calculations are based on a mass flow of 30 L/h·m² and a seawater temperature of 17° C.

1. Heat Balance at the Point of Condensation

Water evaporates through the hydrophobic membrane and the subsequent condensation takes place on the surface of the water-filled pores of the hydrophobic membrane. The associated heat transport can be described mathematically as follows. The heat loss is assumed to be one part per thousand in this example. The temperature increase is assumed to be 0.14 K.

Heat loss: $\dfrac{QW2 + QM2}{QM1} = \dfrac{1}{1000}$

Temperature increase: $T2 = T1 + 0,14K$

Heat balance: $Okon = QW2 + QM2 + QM1 = M * Hv$ where:

$Q_{kon} = M * Hv$ $QM1 = \dfrac{\lambda_{M1}}{L_1}(A_1 - A_{e1})(T2 - T1)$ $QM2 = \dfrac{\lambda_{M2}}{L_2}(A_2 - A_{e2})(T2 - T3)$ $QW2 = \dfrac{\lambda_W}{L_{e2}}A_{e2}(T2 - T3) + Mcp(T2 - T3)$ Qkon=heat of condensation
QM1=thermal conduction through the hydrophobic membrane
QM2=thermal conduction through the hydrophilic membrane
QW1=thermal conduction and transport through the water
λ=thermal conductivity coefficient
A=cross-sectional area
L=thickness of the membrane
M=mass flow
cp=thermal capacity
Hv=heat of vaporization
T1=temperature at the site of evaporation
T2=temperature at the site of condensation
T3=temperature in the bulk of the fresh water Table 1 shows the results of calculations for a given mass flow of 30 L/h·m². The temperature increase in seawater is 1° K. This shows that the desired quasi-isothermal process is achieved.

TABLE 1

| | Seawater in | | | Seawater out | | | Drinking water out | | |
|---|---|---|---|---|---|---|---|---|---|
| T [° C.] | M [kg/s] | Conc. [g/kg] | T [° C.] | M [kg/s] | Conc. [g/kg] | T [° C.] | M [kg/s] | Conc. [g/kg] |
| 17 | $9.2 \times 10^{-3}$ | 36 | 18 | $8.3 \times 10^{-4}$ | 50 | 17 | $8.3 \times 10^{-3}$ | — |

2. Capillary Condensation

The water vapor condenses in the pores of the hydrophilic membrane, forming a curved surface in the capillary. The vapor pressure prevails above this surface is pv. This vapor pressure pv is reduced in comparison with the vapor pressure pv0 on a planar surface and is thus the driving force for condensation of water vapor in the capillary. The reduced vapor pressure pv can be calculated with the help of the Kelvin equation 2.a and equations 2.b and 2.c. The capillary pressure pk which must be applied to draw water out of the capillary is calculated using equation 2.b and must be at least as great as the reduced pressure which is needed to reduce the vapor pressure and can be calculated from Kelvin equation 2.a.

Equation 2.a:

$$p_K = \dfrac{RT}{V_L}\ln\dfrac{p_V^0}{p_V} \text{ (Kelvin equation)}$$

Equation 2.b:

$$p_K = \dfrac{2\gamma_L \cos\delta}{r}$$

Equation 2.c:

-continued $$\gamma_{H_2O} = 0{,}1179 \frac{N}{m}\left(1 - \frac{T}{T_{krit.}}\right)^{\frac{4}{3}}$$

where:
- pk=capillary pressure
- VL=molar volume of the liquid (water: 18.05 cm$^3$/mol)
- pv0=vapor pressure at pk=0
- pv=vapor pressure
- R=general gas constant 8.31441 J/molK
- T=temperature
- Tkrit.=critical temperature (water: 647.3 K)
- γL=surface tension
- δ=wetting angle
- r=radius of the capillary Table 2 shows the values determined for the example calculation. The vapor pressure pv is reduced by 170 Pa in comparison with the vapor pressure Pv0 of 2300 Pa. With a pore radius of 12 nm, a capillary pressure of 120,000 Pa is achieved. At least this capillary pressure must be applied by the electro-osmotic micropump.

TABLE 2

| Capillary condensation | | |
| --- | --- | --- |
| Pv [Pa] | P$_k$ [Pa] | r [m] |
| 2130 | 120 × 10$^5$ | 12 × 10$^{-9}$ |

3. Hydrophobic Membrane

The properties of the hydrophobic membrane can be determined with a given mass flow and the vapor pressure difference Dp resulting from the reduction in vapor pressure due to capillary condensation (equation 3.a).

Equation 3.a:

$$M = \frac{DMw}{RT}\frac{A\Psi}{L\tau}\Delta P$$

where:
- M=mass flow
- ΔP=pressure difference
- R=general gas constant 8.31441 J/molK
- T=temperature
- D=diffusion coefficient
- Mw=molecular weight
- Ψ=porosity (Ψ=Ue/U where Ue=empty volume; U=total volume of the porous membrane)
- A=cross-sectional area (Ae=ΨA/√τ, Ae=effective cross-sectional area)
- τ=tortuosity factor
- L=thickness of the porous membrane (τ=(Le/L)$^2$, Le: effective length of the pores)

Table 3 shows the thickness of the membrane with a corresponding pressure difference and a preselected porosity and tortuosity. This yields a value of 1 μm for the layer thickness.

TABLE 3

| Hydrophobic membrane | | | |
| --- | --- | --- | --- |
| Hydrophobic membrane | | | |
| M [kg/s] | A [m$^2$] | L [m] | P [Pa] |
| 8.3 × 10$^{-3}$ | 1 | 10$^{-6}$ | 170 |

4. Electro-Osmotic Pump

To retain the driving force for condensation, i.e., the vapor pressure difference, the condensed water must be transported out of the capillaries. To do so, the method of the electro-osmotic micropump is used. A mathematical description of this process can be found in C. L. Rice und R. Whitehead (Electrokinetic Flow in a Narrow Cylindrical Capillary; *J. Phys. Chem.* 69 (1965) 4017-4024) and S. Zeng, C. H. Chen, J. C. Mikkelsen Jr. and J. G. Santiago (Fabrication and characterization of electro-osmotic micro-pumps, *Sensors and Actuators* B 79 (2001) 107-114). The equations yield the maximum volume flow (mass flow/density) 4.a, the maximum achievable pump pressure 4.b and the maximum voltage 4.c.

Equation 4.a:

$$\text{Max. volume flow}(P=0): \quad V_{max} = \frac{\lambda^2 i_{EOF}}{\varepsilon \zeta}\frac{BF1}{BF2}$$

Equation 4.b:

$$\text{Max. pressure}(V=0): \quad \Delta P_{max} = -\frac{8\mu L \tau \lambda^2 i_{EOF}}{\varepsilon \zeta A \Psi r^2}\frac{BF1}{BF2}$$

Equation 4.c:

$$\text{Max. voltage}(V=0): \quad U_{max} = \frac{\mu L \tau \lambda^2 i_{EOF}}{\varepsilon^2 \zeta^2 A \Psi}\frac{1}{BF1}$$

The volume flow V is related to the pressure difference as expressed in equation 4.d.

Equation 4.d:

$$V = V_{max}\left(1 - \frac{\Delta P}{\Delta P_{max}}\right)$$

The minimum power as a function of pressure and volume flow, not taking into account irreversible losses (surface conductivity, bulk conductivity) can be calculated according to equation 4.e.

Equation 4.e:

$$\text{Power} = U_{max}i_{EOF}\left(1 - \frac{\Delta P}{\Delta P_{max}}\right) = \frac{\mu L \tau}{\lambda^2 A \Psi}\frac{BF2}{BF1^2}Q^2 + QP$$

The following abbreviations have been used in the above equations:

$$BF1 = \left(1 - \frac{2\lambda I_1(r)}{rI_0(r/\lambda)}\right)$$

$$BF2 = \left(1 - \frac{2\lambda I_1(r/\lambda)}{rI_0(r/\lambda)} - \frac{I_1^2(r/\lambda)}{I_0^2(r/\lambda)}\right)$$

where $I_n(x)$=modified Bessel function of the first kind of the n-th order:

$$I_n(x) = i^{-n} J_n(ix) = \sum_{v=0}^{\infty} \frac{1}{v!\Gamma(n+v+1)} \left(\frac{x}{2}\right)^{2v+n}$$

where:
V=volume flow
$\Delta P$=pressure difference (output-input)
$\Psi$=porosity ($\Psi$=Ue/U, Ue=empty volume; U=total volume of the porous medium)
A=cross-sectional area (Ae=$\Psi A/\sqrt{\tau}$, Ae=effective cross-sectional area)
r=effective pore radius of the porous medium
$\mu$=dynamic viscosity
$\tau$=tortuosity factor
L=thickness of the porous medium ($\tau$=(Le/L)$^2$, Le=effective length of the pores)
$\epsilon$=permittivity ($\epsilon$=$\epsilon 0 \cdot \epsilon R$, $\epsilon 0$=electric field constant, $\epsilon R$: dielectric constant)
$\zeta$=zeta potential
U=voltage
$\lambda$=thickness of diffuse double layer (Debye length)
I1=modified Bessel function of the first kind of the first order
I0=modified Bessel function of the first kind of the zero-th order
$\kappa$=conductivity
iEOF=current through EOF These equations yield the properties of the hydrophilic membrane. The membrane must have these properties to allow achieving of an electro-osmotic flow with a suitable pumping force. Values for the pore radius, the thickness and surface charge are obtained in this way.

Table 4 shows the aforementioned membrane properties for the calculated example. In addition, it also shows the positive results obtainable by the method according to this invention. Furthermore, values for the maximum voltage (7 volts) and the resulting current (13A) are also given. The energy consumption amounts to 92 W, which means that only 3 Wh is needed per liter of drinking water.

The invention claimed is:

1. Water processing method, by means of membrane distillation, wherein
   the water to be processed is held in a supply chamber, a wall of which is formed at least in part by a stack of membrane layers which are permeable to water vapor, said stack comprising a hydrophobic membrane and a hydrophilic membrane, wherein the hydrophilic membrane runs parallel to the hydrophobic membrane and is located on the side of the hydrophobic membrane that is remote from the water to be processed,
   the hydrophilic membrane has a greater thickness in comparison with the hydrophobic membrane,
   the hydrophilic membrane has a lower thermal conduction per unit area in comparison with the hydrophobic membrane,
   a vapor pressure difference between the water to be processed and condensed water is created by a pumping action so that the membrane distillation is driven by the vapor pressure difference resulting from the pumping action, the water condensing in the pores of the hydrophilic membrane,
   the water pressure difference is at least partially created by the fact that the condensed water is pumped out of the hydrophilic membrane by a micropump method including a force acting on the water molecules in the pores of the hydrophilic membrane, and
   wherein, in order to provide an electro-osmotic pump action, two flat electrodes are arranged in parallel with the hydrophilic membranes such that at least a layer of the hydrophilic membrane runs between the two electrodes.

2. Water processing method according to claim 1, characterized in that the distillation is essentially isothermal, the temperature of the condensing fresh water being higher than the temperature of the evaporating water to be processed and the temperature difference being less than 30° C.

3. Water processing method according to claim 1, wherein the micropump method is an electro-osmotic pump method.

4. Water processing method according to claim 1, wherein the vapor pressure difference is at least partially created by the fact that the water to be processed is pumped with pressure into the supply chamber.

5. Method according to claim 1, wherein the vapor permeability of the hydrophobic membrane is at least 100 L/(h m$^2$) at a pressure difference of 60 bar.

6. Method according to claim 1, wherein the thickness of the hydrophobic membrane is at most 100 µm.

7. Method according to claim 1, wherein the thickness of the hydrophilic membrane is at least 0.01 mm.

8. Method according to claim 1, wherein the thickness of the hydrophilic membrane is at least 10 times the thickness of the hydrophobic membrane.

TABLE 4

| Electro-osmotic Flow | | | | | | | | | | |
|---|---|---|---|---|---|---|---|---|---|---|
| Hydrophilic Membrane | | | | | | | | | | |
| A [m] | L [m] | r [m] | [m] | $\zeta$ [V] | Umax [V] | Mmax [kg/s] | Pmax [Pa] | $i_{EOF}$ [A] | $i_{tot}$ [A] | Power [W] |
| 1 | $10^{-4}$ | $6 \times 10^{-9}$ | $6 \times 10^{-9}$ | −0.1 | 7 | $2.3 \times 10^{-1}$ | $125 \times 10^5$ | 365 | 13 | 92 |

9. Method according to claim 1, wherein the thermal conduction per unit area through the hydrophobic membrane is at least three times the thermal conduction per unit area through the hydrophilic membrane.

10. Method according to claim 1, wherein the hydrophobic membrane is porous and its pore size is at most 100 μm.

11. Method according to claim 1, wherein the hydrophilic membrane comprises a plurality of layers and the individual layers have different properties.

12. The water processing method according to claim 1, wherein the distillation is essentially isothermal, the temperature of the condensing fresh water is higher than the temperature of the evaporating water to be processed and the temperature difference is less than 10° C.

13. The water processing method according to claim 1, wherein the distillation is essentially isothermal, the temperature of the condensing fresh water is higher than the temperature of the evaporating water to be processed and the temperature difference is less than 1° C.

14. The method according to claim 1, wherein the thickness of the hydrophobic membrane is at most 10 μm.

15. The method according to claim 1, wherein the thickness of the hydrophilic membrane is at least 0.1 mm.

16. The method according to claim 1, wherein the thickness of the hydrophilic membrane is at least 100 times the thickness of the hydrophobic membrane.

17. The method according to claim 1, wherein the hydrophobic membrane is porous and its pore size is at most 5 μm.

18. Device for processing water, by means of membrane distillation, comprising:
- a supply chamber, the wall of which is formed at least in part by a stack of membrane layers which are permeable to water vapor, said stack comprising a hydrophobic membrane and a hydrophilic membrane located on the side of the hydrophobic membrane that is remote from the water to be processed, wherein
- the hydrophilic membrane runs parallel to the hydrophobic membrane, the hydrophilic membrane has a greater thickness in comparison with the hydrophobic membrane and having a lower thermal conduction per unit area so that the water condenses in the pores of the hydrophobic membrane in proximity to the interface with the hydrophobic membrane; and
- a pump device capable of creating a pumping action by means of which a vapor pressure difference is generated between the water to be processed and condensed water so that the membrane distillation is driven by the vapor pressure difference resulting from the pumping action, the water condensing in the pores of the hydrophilic membrane, wherein the water pressure difference is at least partially created by the fact that the condensed water is pumped out of the hydrophilic membrane by a micropump method including a force acting on the water molecules in the pores of the hydrophilic membrane, and wherein, in order to provide an electro-osmotic pump action, two flat electrodes are arranged in parallel with the hydrophilic membranes such that at least a layer of the hydrophilic membrane runs between the two electrodes.

19. Device according to claim 18, the electrodes optionally being parts of the hydrophilic membrane and the layer running between them having an electric surface charge.

20. Device according to claim 18, wherein the supply chamber is pressure resistant and a pump is provided by which the water is pumped with pressure into the supply chamber.

21. A device according to claim 18, wherein the vapor permeability of the hydrophobic membrane is at least 100 L/(h m$^2$) at a pressure difference of 60 bar.

22. A device according to claim 18, wherein the thickness of the hydrophobic membrane is at most 100 μm.

23. A device according to claim 18, wherein the thickness of the hydrophilic membrane is at least 0.01 mm.

24. A device according to claim 18, wherein the thickness of the hydrophilic membrane is at least 10 times the thickness of the hydrophobic membrane.

25. A device according to claim 18, wherein the thermal conduction per unit area through the hydrophobic membrane is at least three times the thermal conduction per unit area through the hydrophilic membrane.

26. A device according to claim 18, wherein the hydrophobic membrane is porous and its pore size is at most 100 μm.

27. A device according to claim 18, wherein the hydrophilic membrane comprises a plurality of layers and the individual layers have different properties.

28. A device according to claim 18, wherein the thickness of the hydrophobic membrane is at most 10 μm.

29. A device according to claim 18, wherein the thickness of the hydrophilic membrane is at least 0.1 mm.

30. A device according to claim 18, wherein the thickness of the hydrophilic membrane is at least 100 times the thickness of the hydrophobic membrane.

* * * * *

UNITED STATES PATENT AND TRADEMARK OFFICE
CERTIFICATE OF CORRECTION

PATENT NO. : 7,488,421 B2 Page 1 of 1
APPLICATION NO. : 10/556363
DATED : February 10, 2009
INVENTOR(S) : Hambitzer et al.

It is certified that error appears in the above-identified patent and that said Letters Patent is hereby corrected as shown below:

On the cover page, item

[*] Notice: Subject to any disclaimer, the term of this patent is extended or adjusted under 35 USC 154(b) by 441 days.

Delete the phrase "by 441 days" and insert -- by 348 days --

Signed and Sealed this

Fourth Day of August, 2009

JOHN DOLL
*Acting Director of the United States Patent and Trademark Office*